(12) United States Patent
Shibukawa

(10) Patent No.: US 8,062,160 B2
(45) Date of Patent: Nov. 22, 2011

(54) TRAVEL ASSEMBLY

(75) Inventor: Takeshi Shibukawa, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 286 days.

(21) Appl. No.: 12/392,406

(22) Filed: Feb. 25, 2009

(65) Prior Publication Data

US 2009/0215568 A1    Aug. 27, 2009

(30) Foreign Application Priority Data

Feb. 26, 2008   (JP) .................. 2008-044694

(51) Int. Cl.
*F16H 48/30* (2006.01)
(52) U.S. Cl. ........................ 475/150; 180/372
(58) Field of Classification Search .......... 180/372
See application file for complete search history.

(56) References Cited

U.S. PATENT DOCUMENTS

| | | | |
|---|---|---|---|
| 2,718,381 A * | 9/1955 | Moon | 403/51 |
| 4,615,231 A * | 10/1986 | Takahashi | 74/467 |
| 7,396,308 B2 * | 7/2008 | Tabata et al. | 475/159 |
| 7,578,763 B2 * | 8/2009 | Morita | 475/331 |
| 2004/0065169 A1 | 4/2004 | Ciszak et al. | |

* cited by examiner

*Primary Examiner* — Justin Holmes
(74) *Attorney, Agent, or Firm* — Crowell & Moring LLP

(57) ABSTRACT

A travel assembly, for example, suited for arrangement on a vehicle such as a mining dump truck, is provided with a travel motor, a planetary speed reduction mechanism for transmitting rotation of the travel motor at a lower rotational speed, a spindle forming an axle, and a wheel supported on the spindle via a tapered roller bearing and rotatable by the planetary speed reduction mechanism. The planetary speed reduction mechanism includes a sun gear rotatable by rotation of a shaft of the travel motor, planet gears for rotating the wheel in response to rotation of the sun gear, stepped pins forming rotary shafts for the planet gears, a carrier for holding the stepped pins thereon, and bolts for fixedly securing the stepped pins on the carrier. The travel assembly is provided with a spline connection connecting the spindle and the carrier with each other and a limiting member for limiting movements of the bolts in a direction toward the tapered roller bearing.

6 Claims, 5 Drawing Sheets

TRAVEL ASSEMBLY

CROSS-REFERENCE TO RELATED APPLICATION

This application claims the priority of Japanese Patent Application 2008-44694 filed Feb. 26, 2008, which is incorporated herein by reference.

BACKGROUND OF THE INVENTION

1. Field of the Invention

This invention relates to a travel assembly suited for arrangement on a vehicle such as a mining dump truck and having a travel motor and a planetary speed reduction mechanism for transmitting rotation of the travel motor at a lower rotational speed.

2. Description of the Related Art

As a conventional technology of this sort, there is one disclosed in Ciszak et al. U.S. Patent Application Publication No. 2004/0065169 A1. This conventional technology is provided with a travel motor, a planetary speed reduction mechanism for transmitting rotation of the travel motor at a lower rotational speed, a spindle forming an axle, a hub arranged on an outer side of the spindle and splined to the spindle, and a wheel supported on the hub via tapered roller bearings and rotatable by the planetary speed reduction system. The planetary speed reduction mechanism is provided with a sun gear rotatable by a shaft of the travel motor, planet gears for rotating the wheel in response to rotation of the sun gear, stepped pins forming rotary shafts for the planetary gears, a carrier supporting the stepped pins thereon and splined to the above-mentioned hub, and bolts fixedly securing the above-mentioned stepped pin on the carrier. The conventional travel assembly equipped with such a construction as described above is used for the rotational drive or the like of a tire of a mining dump truck.

With respect to the above-mentioned conventional technology, there is an outstanding desire for a construction that eliminates the hub splined to both the spindle and the planetary speed reduction mechanism with a view to increasing the strength of the spindle and cutting down the manufacturing cost, etc. To adopt such a non-hub construction as described above, it may be contemplated to directly spline the spindle and the carrier to each other. When constructed so, however, heads of the bolts that fixedly secure the stepped pins on the carrier are located opposite the proximal tapered roller bearing, leading to a potential problem that, when the bolts become loose by vibrations transmitted to the stepped pins, carrier and bolts, the heads of the bolts may come into contact with the proximal tapered roller bearing and may damage the proximal tapered roller bearing.

SUMMARY OF THE INVENTION

With the above-mentioned circumstances of the conventional art in view, the present invention has as an object thereof the provision of a travel assembly capable of realizing spline connection between a spindle and a planetary speed reduction mechanism.

To achieve the above-described object, the present invention provides a travel assembly provided with a travel motor, a planetary speed reduction mechanism for transmitting rotation of the travel motor at a lower rotational speed, a spindle forming an axle, and a wheel supported on the spindle via a tapered roller bearing and rotatable by the planetary speed reduction mechanism, said planetary speed reduction mechanism comprising a sun gear rotatable by rotation of a shaft of the travel motor, planet gears for rotating the wheel in response to rotation of the sun gear, stepped pins forming rotary shafts for the planet gears, a carrier for holding the stepped pins thereon, and bolts for fixedly securing the stepped pins on the carrier, wherein the travel assembly is provided with a spline connection connecting the spindle and the carrier with each other and a limiting member for limiting movements of the bolts in a direction toward the tapered roller bearing.

The present invention constructed as described above can rotate the wheel while transmitting reaction force to rotation of the wheel to the spline connection between the carrier and the spindle via the carrier without needing the arrangement of a hub to be splined to both the spindle and the carrier. It is, therefore, possible to make use of the space, which has heretofore been needed for the installation of the hub, as a space for permitting an enlargement of the diametrical dimension of the spindle. As a consequence, the diametrical dimension of the spindle can be enlarged to increase its strength, and further, the elimination of the hub can reduce the number of components. In addition, the bolts that fixedly secure the stepped pins on the carrier are prevented by the limiting member from moving in the direction toward the tapered roller bearing. As a consequence, it is possible to prevent contact between heads of the bolts and the tapered roller bearing, and hence, to avoid damages to the tapered roller bearing.

Preferably, the travel assembly according to the present invention may be further provided with a retainer, which is in contact with an end face of the spindle and the carrier and presses the tapered roller bearing, and the limiting member comprises a flange portion having an outer diameter greater than a bore inner diameter of the tapered roller bearing and arranged on the retainer such that the flange portion is disposed between heads of the bolts and the tapered roller bearing. The present invention constructed as mentioned immediately above can prevent by the retainer leakage of the internal lube oil of the planetary speed reduction mechanism to the side of the travel motor, and owing to the construction of the limiting member by the flange portion arranged on the retainer, can reduce an increase in the number of components.

Preferably, the travel assembly according to the present invention may be further provided with a gear coupling arranged in a vicinity of end faces of the stepped pins, said end faces being located on a side opposite to a side where the retainer is arranged, to transmit rotation of the sun gear as rotations of the planetary gears for rotating the wheel, and the gear coupling forms another limiting member for limiting movements of the stepped pins in a direction away from the retainer. In the present invention constructed as mentioned immediately above, when loosening occurs on the bolts, movements of the bolts in the direction toward the tapered roller bearing are limited by the limiting member. At this time, the limiting force of the limiting member to the bolts is transmitted to the stepped pins via the bolts so that, when the stepped pins begin to move in the direction away from the retainer, the movements of the stepped pins are limited by the gear coupling. Accordingly, the stepped pins and the bolts are maintained in the threaded engagement. It is hence possible to surely prevent separation of the bolts from the stepped pins.

In the travel assembly according to the present invention, the limiting member may preferably include a retaining wire maintained in engagement with the bolts to prevent separation of the bolts from the stepped pins. In the present invention constructed as mentioned immediately above, the separation of the bolts from the stepped pins can be surely prevented by both of the limitation to the movements of the bolts in the direction toward the tapered roller bearing by the limiting member and the prevention of separation of the bolts from the stepped pins by the retaining wire.

In the travel assembly according to the present invention, the spline connection may preferably be provided with an oil passage for guiding internal lube oil of the planetary speed reduction mechanism to the spline connection. According to the present invention constructed as mentioned immediately above, the internal lube oil of the planetary speed reduction mechanism can be guided to the spline connection via the oil passage, and therefore, good lubrication can be assured for the spline connection. As a consequence, it is possible to prevent wearing of the spline connection by reaction force or the like to be applied to the spline connection via the carrier.

Owing to the arrangement of the spline connection to connect the spindle and the carrier of the planetary speed reduction mechanism and the limiting member to limit movements of the bolts, which fixedly secure the stepped pins, in the direction toward the tapered roller bearing, the present invention can rotate the wheel while transmitting reaction force, which is produced to rotation of a rotating member such as the wheel, to the spline connection between the carrier and the spindle via the carrier without needing a hub to be splined to both the spindle and the carrier as in the conventional art. It is, therefore, possible to increase the diametrical dimension of the spline to provide the spindle with greater strength and to realize a more stable structure. It is also possible to reduce the number of components compared with the conventional art, and hence to cut down the manufacturing cost. In addition, the movements of the bolts in the direction toward the tapered roller bearing can be prevented by the limiting member. It is, therefore, possible to prevent contact between the heads of the bolts the tapered roller bearing so that the tapered roller bearing can be protected from damages and excellent durability can be assured.

DETAILED DESCRIPTION OF PREFERRED EMBODIMENTS

The present invention will hereinafter be described based on the accompanying drawings of best modes for practicing the travel assembly according to the present invention.

Figure 1:
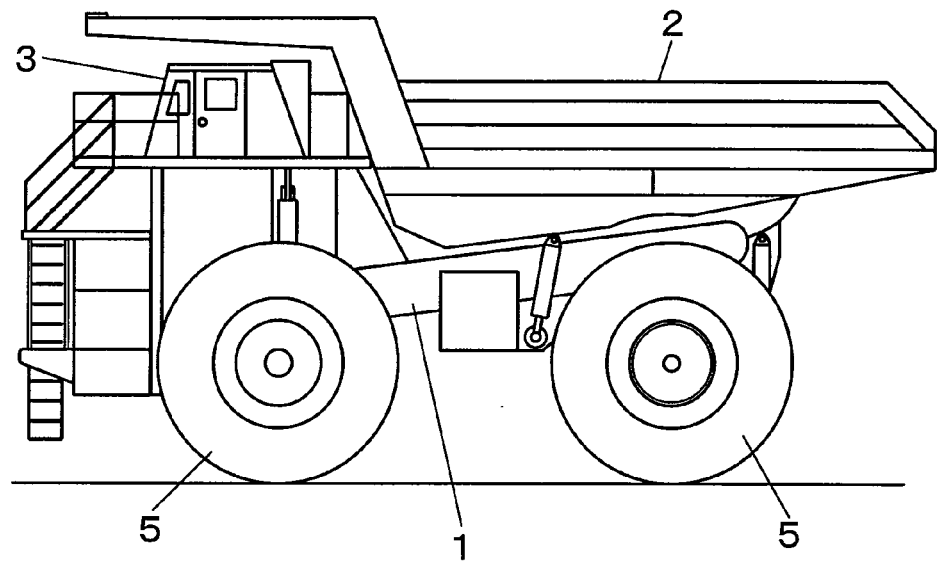
FIG. 1 is a side view of a mining dump truck illustrated as one example of vehicles on which the travel assembly according to the present invention can be arranged.
Figure 2:
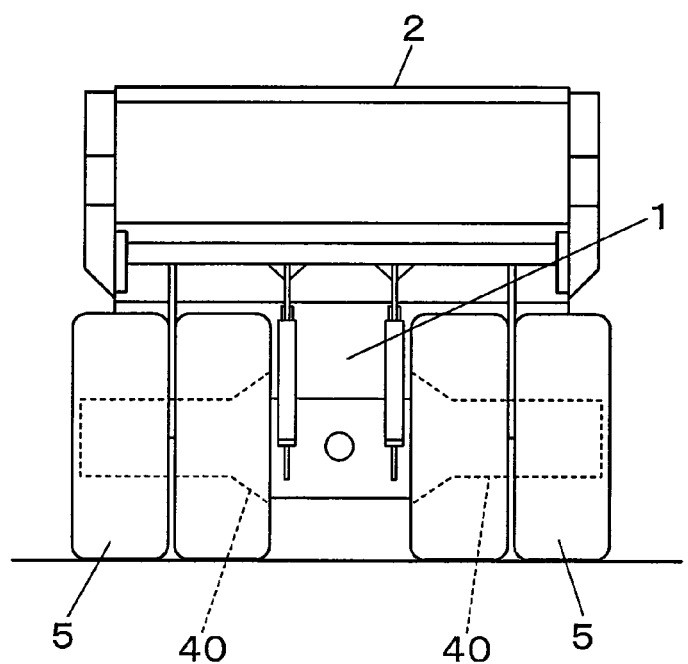
FIG. 2 is a rear view of the dump truck depicted in FIG. 1.

Travel assemblies to which the present invention is applied are arranged on a vehicle, for example, a mining dump truck shown in FIGS. 1 and 2. This mining dump truck is provided with a chassis 1, a load carrying platform 2 arranged for tilting movement on the chassis 1, a cab 3 arranged on a front part of the chassis 1, and plural tires 5. As depicted in FIG. 2, each combination of two tires 5 are connected to a corresponding travel assembly 40 such that these tires 5 can be rotationally driven by rotational force applied by the corresponding travel assembly 40.

A travel assembly 4A according to one embodiment of the present invention will next be described in detail with reference to FIGS. 3, 4 and 5.

Figure 3:
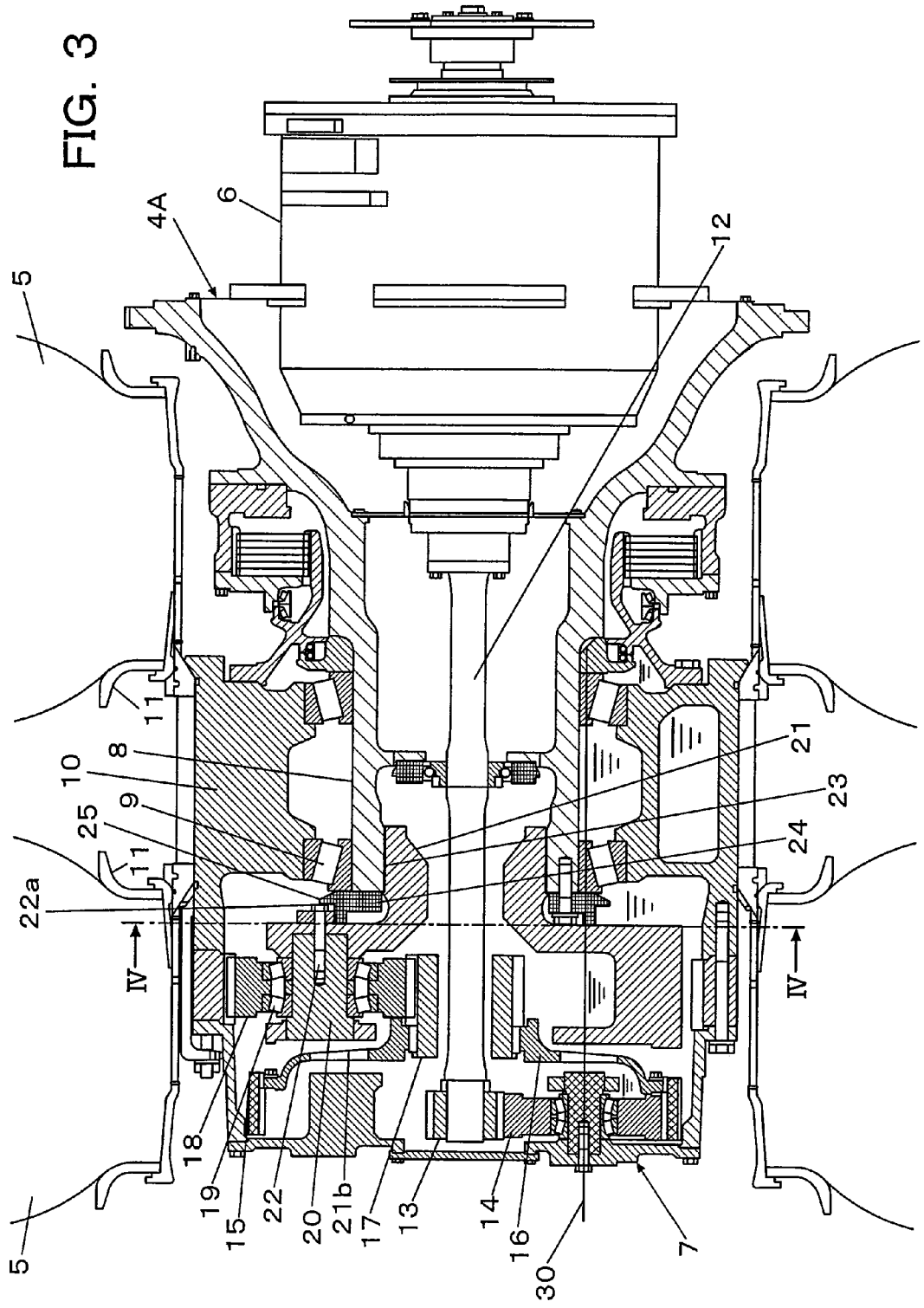
FIG. 3 is a fragmentary cross-sectional view of a travel assembly according to one embodiment of the present invention.

As illustrated in FIG. 3, the travel assembly 4A according to the one embodiment of the present invention is provided with a travel motor 6, a planetary speed reduction mechanism 7 for transmitting rotation of the travel motor 6 at a lower rotational speed, a spindle 8 forming an axle, and a wheel 10 rotatably supported on the spindle 8 via tapered roller bearings 9 for rotation by the planetary speed reduction mechanism 7. Tires 5 are integrally mounted on rims 11, and the rims 11 and the above-mentioned wheel 10 are connected together.

The planetary speed reduction mechanism 7 is connected to a shaft 12 of the travel motor 6, and includes a first-stage sun gear 13 rotatable in response to rotation of the shaft 12, plural planet gears 14 arranged in meshing engagement with the sun gear 13, a ring gear 15 provided at an inner periphery thereof with teeth which are in meshing engagement with the planet gears 14, and a gear coupling 16 rotatable in response to rotation of the respective planet gears 14. Also included are a second-stage sun gear 17 rotatable in response to rotation of the gear coupling 16, and plural planet gears 18 arranged in meshing engagement with the sun gear 17 to rotate the wheel 10 in response to rotation of the sun gear 17. Further included are plural stepped pins 20 forming rotary shafts for the respective planet gears 18, tapered roller bearings 19 interposed between the respective stepped pins 20 and their corresponding planet gears 18, a carrier 21 holding the respective stepped pins 20 thereon, and bolts 22 fixedly securing the respective stepped pins 20 on the carrier 21. Heads 22a of the respective bolts 22 are arranged opposite the tapered roller bearings 9 that rotatably support the above-mentioned wheel 10 thereon.

A spline connection 23 is also arranged to connect the spindle 8 and the carrier 21 of the planetary speed reduction mechanism 7. As depicted in FIG. 5, splines 21a on the carrier 21 are arranged such that they slightly protrude toward the planetary speed reduction mechanism 7 beyond splines 8a on the spindle 8.

Also provided is a retainer 24, which is maintained in contact with an end face of the spindle 8 and the carrier 21 and presses the proximal tapered roller bearing 9.

This embodiment is provided with a limiting member that limits movements of the bolts 22 in a direction toward the proximal tapered roller bearing 9 due to loosening of the bolts 22 by vibrations applied to the stepped pins 20, carrier 21 and bolts 22.

Figure 5:
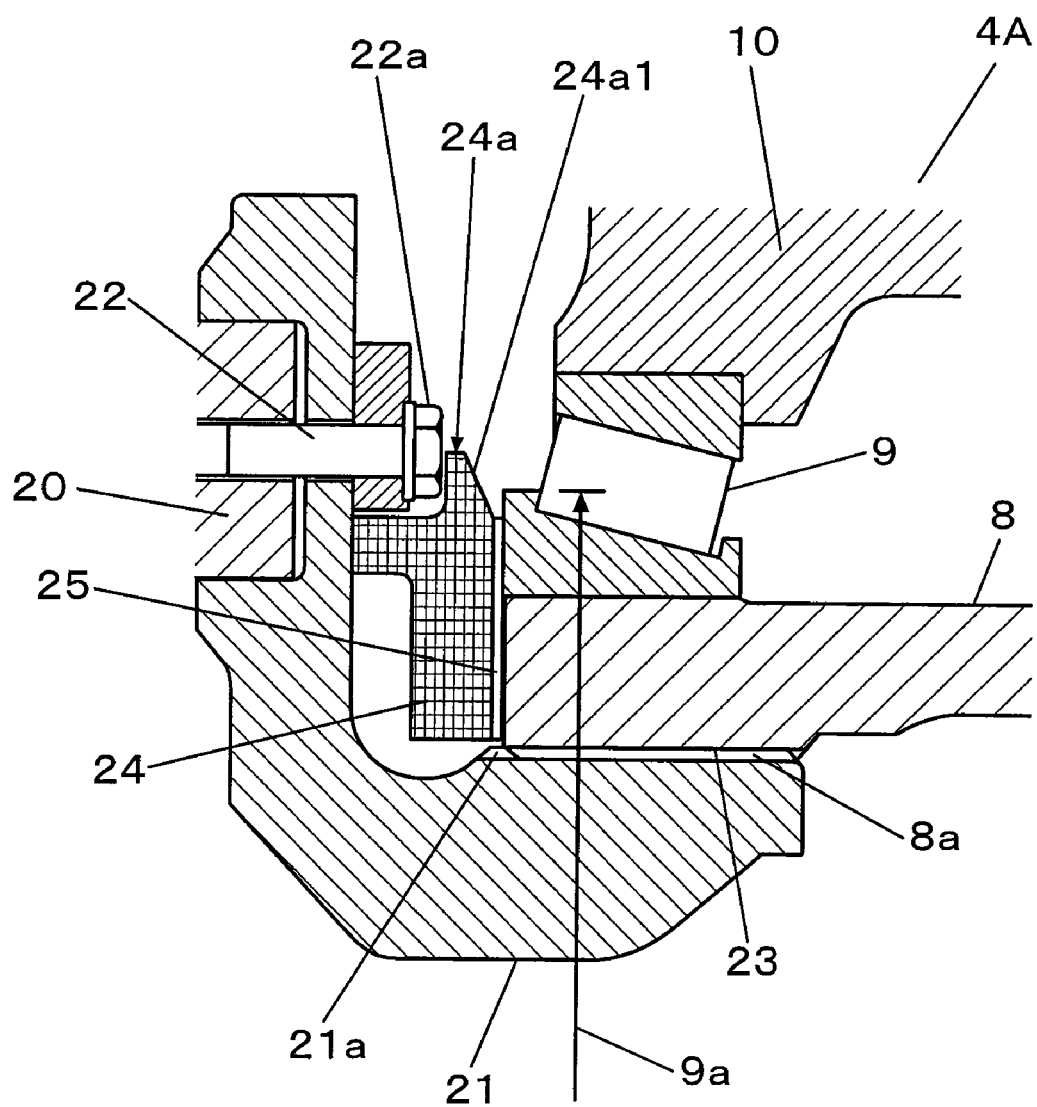
FIG. 5 is an enlarged fragmentary cross-sectional view of FIG. 3.

As depicted by way of example in FIG. 5, this limiting member is comprised of a flange portion 24a, which is arranged on the retainer 24 such that the flange portion 24a is located between the heads 22a of the respective bolts 22 and the proximal tapered roller bearing 9. The flange portion 24a has an outer diameter greater than a bore inner diameter 9a of the proximal tapered roller bearing 9.

As shown in FIG. 3, the above-mentioned gear coupling 16 is arranged in the proximity of end faces of the respective stepped pins 20, said end faces being located on a side opposite to the side where the retainer 24 is arranged, and forms another limiting member that limits movements of the respective stepped pins 20 when the stepped pins 20 move in a direction away from the retainer 24 due to loosening of the bolts 22 by vibrations applied to the stepped pins 20, carrier 21 and bolts 22. Circular holes 21b are formed in the gear coupling 16 at locations facing the end faces of the respective stepped pins 20 such that a smaller total area of contact occurs between the gear coupling 16 and the respective stepped pins 20, for example, when the stepped pins 20 move toward the gear coupling 16 and come into contact with the gear coupling 16.

Figure 4:
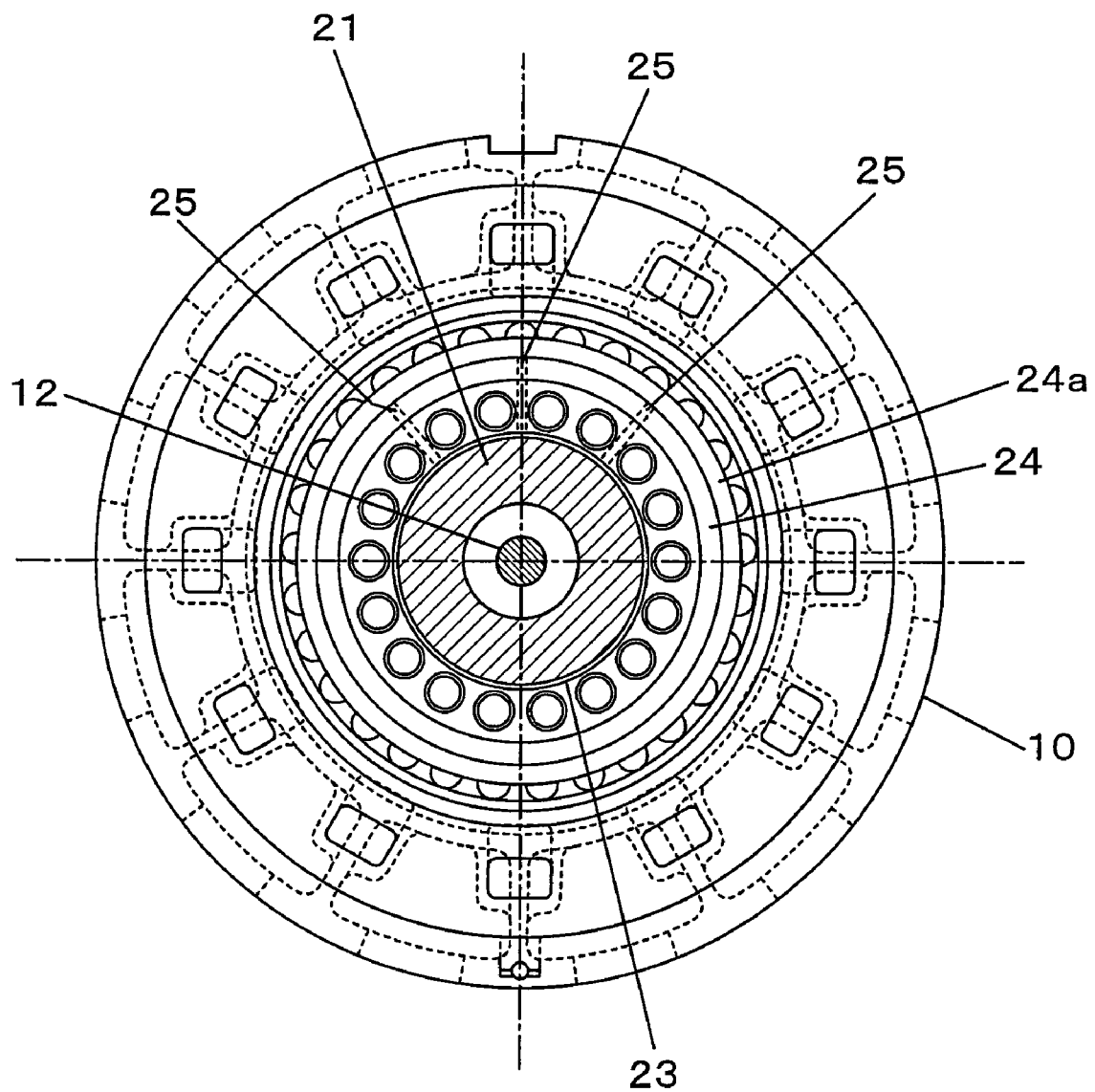
FIG. 4 is a cross-sectional view taken in the direction of arrows IV-IV of FIG. 3.

As depicted in FIGS. 4 and 5, this embodiment is provided with an oil passage that guides the internal lube oil of the planetary speed reduction mechanism 7 to the spline connection 23 that connects the spindle 8 and the carrier 21 with each other. The lube oil is stored inside the planetary speed reduction mechanism 7, for example, to a lube oil level 30 shown in FIG. 3.

The above-mentioned oil passage that guides the lube oil is formed, for example, on the retainer 24. This oil passage comprises a groove 25 formed on the retainer 24.

As shown in FIG. 5, the retainer 24 is also provided with a guide portion for guiding the internal lube oil of the planetary speed reduction mechanism 7 to the oil passage, that is, the groove 25. This guide portion comprises, for example, an inclined surface 24a1 formed on the flange portion 24a.

When the travel motor 6 depicted in FIG. 3 is driven in this embodiment constructed as described above, the shaft 12 is rotated, and by this shaft 12, the first-stage sun gear 13 is rotated. By the rotation of this sun gear 13, the respective planet gears 14 rotate inside the ring gear 15. In association with the rotation of these planet gears 14, the gear coupling 16 rotates and the rotational force of the gear coupling 16 is transmitted to the second-stage sun gear 17. By the resulting rotation of the sun gear 17, the respective planet gears 18 are caused to rotate about their corresponding stepped pins 20 and the wheel 10 is also caused to rotate. The rotation of the wheel 10 is transmitted to the tires 5 via the rims 11, so that the tires 5 are rotationally driven and the mining dump truck with such travel assemblies mounted thereon travels.

Even when the bolts 22 undergo loosening due to vibrations applied to the stepped pins 20, carrier 21 and bolts 22 while such a travel is performed, the bolts 22 are held in place to avoid contact of their heads 22a to the proximal tapered roller bearing 9 because movements of the bolts toward the proximal tapered roller bearing 9 are limited by the flange portion 24a of the retainer 24.

During the above-mentioned travel, the internal lube oil of the planetary speed reduction mechanism 7 shown in FIG. 3 is agitated and splashed upwards to lubricate necessary portions, and in addition, the upwardly-splashed lube oil is guided by the inclined surface 24a1 of the flange portion 24a of the retainer 24 shown in FIG. 5 and is guided into the groove 25 formed on the retainer 24, and is then guided to the splines 21a arranged on the carrier 21 to form the spline connection 23. As a result, the spline connection 23 is lubricated.

According to this embodiment, the wheel 10 can be rotated while transmitting reaction force to rotation of the wheel 10 or the like to the spline connection 23 between the carrier 21 and the spindle 8 via the carrier 21 without needing the arrangement of a hub to be splined to both the spindle 8 and the carrier 21. It is, therefore, possible to make use of the space, which has heretofore been needed for the installation of the hub, as a space for permitting an enlargement of the diametrical dimension of the spindle 8. As a consequence, the diametrical dimension of the spindle 8 can be enlarged to increase its strength to realize a more stable structure. Owing to the elimination of the hub, the number of components can be decreased, thereby making it possible to cut down the manufacturing cost.

By the limiting member, specifically the flange portion 24a arranged on the retainer 24, the respective bolts 22 can be prevented from moving in the direction toward the proximal tapered roller bearing 9. As a consequence, it is possible to hold the bolts 22 in place to avoid contact of their heads 22a to the proximal tapered roller bearing 9. The proximal tapered roller bearing 9 can, therefore, be protected from damages to assure excellent durability.

By the retainer 24 that forms a sealing member, it is possible to prevent leakage of the internal lube oil of the planetary speed reduction mechanism toward the travel motor 6, and by the flange portion 24a arranged on the retainer 24, the limiting member is constructed to limit movements of the bolts in the direction toward the tapered roller bearing 9. It is, therefore, possible to reduce an increase in the number of components and hence to contribute to lower manufacturing cost.

When the bolts 22 have undergone loosening, movements of the bolts 22 in the direction toward the proximal tapered roller bearing 9 are limited by the limiting member, specifically the flange portion 24a of the retainer 24. At this time, the limiting force to the bolts 22 as produced by the contact of the heads 22a of the bolts 22 with the flange portion 24a may be transmitted to the stepped pins 20 via the bolts 22 so that the stepped pins 20 may move in the direction away from the retainer 24. In such a case, the movements of the stepped pins 20 are limited by the gear coupling 16, because the gear coupling 16 forms the other limiting member that limits movements of the stepped pins 20 in the direction away from the retainer 24. Therefore, the stepped pins 20 and their corresponding bolts 22 can be maintained in the threaded engagement, thereby assuring the prevention of separation of the bolts 22 from the stepped pins 20. When the stepped pins 20 come into contact with the gear coupling 16, abnormal noise is produced as the gear coupling 16 rotates. The occurrence of such a trouble can, therefore, be readily brought to the attention of the operator of the mining dump truck provided with such travel assemblies.

In this embodiment, the internal lube oil of the planetary speed reduction mechanism 7 can be guided to the spline connection 23 via the oil passage, specifically by groove 25 as mentioned above. Good lubrication can hence be assured for the spline connection 23. As a consequence, it is possible to prevent the wearing of the spline connection 23, which would otherwise take place by reaction force to be applied to the spline connection 23 via the carrier 21 and mutual microvibrations between the spindle 8 and the carrier. Accordingly, excellent durability can be assured.

As the groove 25, that is, the oil passage is formed on the retainer 24, it is also possible to reduce an increase in the number of components and hence to contribute to lower manufacturing cost.

Because the retainer 24 is provided with the flange portion 24a having the guide portion, specifically the inclined surface 24a1 for guiding lube oil, the internal lube oil of the planetary speed reduction mechanism 7 can be smoothly and surely guided into the groove 25 via the inclined surface 24a1, thereby contributing to the assurance of lubrication to the spline connection 23.

The flange portion 24a, which has the inclined surface 24a1 that constructs the guide portion to guide the internal lube oil of the planetary speed reduction mechanism 7 into the groove 25, is formed as a part of the retainer 24, thereby contributing to lower manufacturing cost without leading to an increase in the number of components. In addition, the guide portion is simple in construction and can be easily provided to the retainer 24, because the guide portion is comprised of the inclined surface 24a1 of the flange portion 24a.

Figure 6:
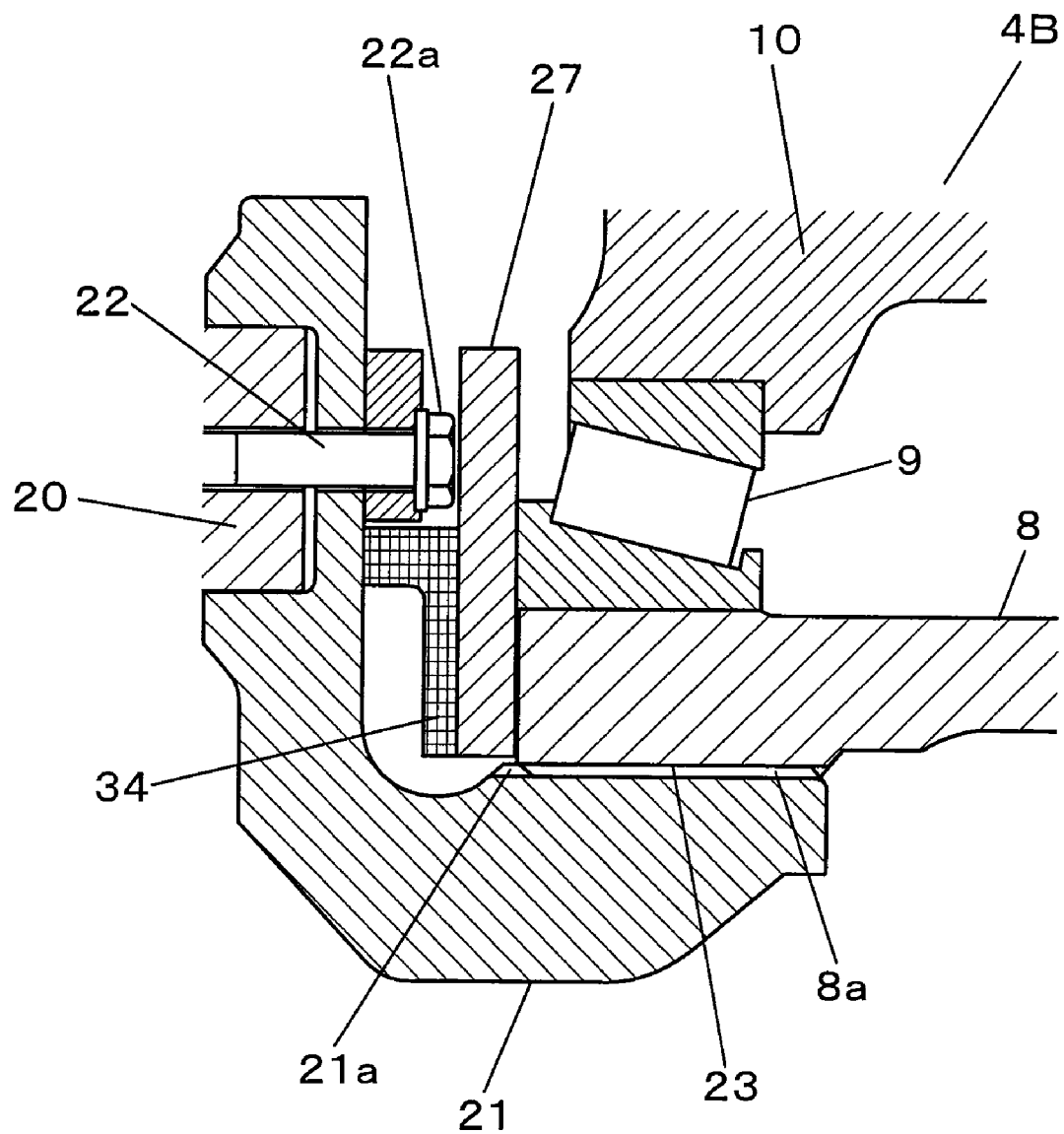
FIG. 6 is an enlarged fragmentary cross-sectional view of a travel assembly according to another embodiment of the present invention.

Referring next to FIG. 6, a travel assembly 4B according to another embodiment of the present invention will be described. In this another embodiment, as a limiting member for limiting movements of the bolts 22a in the direction toward the proximal tapered roller bearing 9, an annular plate member 27 is arranged between a retainer 34 and the proximal tapered roller bearing 9 and the end face of the spindle 8. It is to be noted that in this another embodiment, no oil passage is arranged to guide the internal lube oil of the planetary speed reduction mechanism 7 to the spline connection 23. The remaining construction is similar to the above-described one embodiment shown in FIGS. 3 to 5.

With the another embodiment constructed as described above, the advantageous effect of the groove 25 arranged on the retainer 24, that is, the oil passage in the above-described one embodiment shown in FIGS. 3 to 5 is not available. By the limiting member, specifically the annular plate member 27, however, it is possible to prevent movements of the bolts 22 in the direction toward the proximal tapered roller bearing 9. Like the above-described one embodiment shown in FIGS. 3 to 5, it is, therefore, possible to hold the bolts 22 such that the heads 22a of the bolts 22 do not come into contact with the proximal tapered roller bearing 9. Accordingly, the proximal tapered roller bearing 9 can be protected from damages, thereby making it possible to assure excellent durability.

It is to be noted that in the above-described one embodiment shown in FIGS. 3 to 5, the limiting member which limits movements of the bolts 22 in the direction toward the proximal tapered roller bearing 9 may be configured to include, in addition to the above-described flange portion 24a arranged on the retainer 24, a retaining wire which is fastened to the respective bolts 22a to prevent separation of the bolts 22a from the stepped pins 20. Similarly, the another embodiment shown in FIG. 6 may also be configured to be provided with a retaining wire which is fastened to the respective bolts 22a to prevent separation of the bolts 22a from the stepped pins 20.

The invention claimed is:

1. A travel assembly provided with a travel motor, a planetary speed reduction mechanism for transmitting rotation of said travel motor at a lower rotational speed, a spindle forming an axle, and a wheel supported on said spindle via a tapered roller bearing and rotatable by said planetary speed reduction mechanism, said planetary speed reduction mechanism comprising a sun gear rotatable by rotation of a shaft of said travel motor, planet gears for rotating said wheel in response to rotation of said sun gear, stepped pins forming rotary shafts for said planet gears, a carrier for holding said stepped pins thereon, and bolts for fixedly securing said stepped pins on said carrier, wherein:

said travel assembly is provided with a spline connection connecting said spindle and said carrier with each other and a limiting member for limiting movements of said bolts in a direction toward said tapered roller bearing;

said travel assembly is further provided with a retainer, which is in contact with an end face of said spindle and said carrier and presses said tapered roller bearing; and said limiting member comprises a flange portion having an outer diameter greater than a bore inner diameter of said tapered roller bearing and arranged on said retainer such that said flange portion is disposed between heads of said bolts and said tapered roller bearing.

2. A travel assembly according to claim 1, wherein said travel assembly is further provided with a gear coupling arranged in a vicinity of end faces of said stepped pins, said end faces being located on a side opposite to a side where said retainer is arranged, to transmit rotation of said sun gear as rotations of said planetary gears for rotating said wheel, and said gear coupling forms another limiting member for limiting movements of said stepped pins in a direction away from said retainer.

3. A travel assembly according to claim 1, wherein said limiting member includes a retaining wire fastened to said bolts to prevent separation of said bolts from said stepped pins.

4. A travel assembly according to claim 1, wherein said travel assembly is provided with an oil passage for guiding internal lube oil of said planetary speed reduction mechanism to said spline connection.

5. A travel assembly according to claim 2, wherein said travel assembly is provided with an oil passage for guiding internal lube oil of said planetary speed reduction mechanism to said spline connection.

6. A travel assembly according to claim 3, wherein said travel assembly is provided with an oil passage for guiding internal lube oil of said planetary speed reduction mechanism to said spline connection.

* * * * *